(12) United States Patent
Fujii et al.

(10) Patent No.: US 7,679,494 B2
(45) Date of Patent: Mar. 16, 2010

(54) BICYCLE DISPLAY DEVICE

(75) Inventors: Kazuhiro Fujii, Sakai (JP); Masahiko Fukuda, Sakai (JP); Ryuichiro Takamoto, Sakai (JP)

(73) Assignee: Shimano Inc., Osaka (JP)

( * ) Notice: Subject to any disclaimer, the term of this patent is extended or adjusted under 35 U.S.C. 154(b) by 953 days.

(21) Appl. No.: 11/447,029

(22) Filed: Jun. 6, 2006

(65) Prior Publication Data

US 2007/0068332 A1 Mar. 29, 2007

(30) Foreign Application Priority Data

Aug. 24, 2005 (JP) .............................. 2005-242695
Jan. 26, 2006 (JP) .............................. 2006-017463

(51) Int. Cl.
*B62J 3/00* (2006.01)

(52) U.S. Cl. ....................................... 340/432; 362/473

(58) Field of Classification Search ........................ None
See application file for complete search history.

(56) References Cited

U.S. PATENT DOCUMENTS

| | | | |
|---|---|---|---|
| 5,059,158 A | 10/1991 | Bellio et al. | |
| 5,625,336 A | 4/1997 | Yamamoto | |
| 5,676,021 A | 10/1997 | Campagnolo | |
| 6,048,506 A * | 4/2000 | Fittock et al. | ................. 423/99 |
| 2003/0230228 A1 | 12/2003 | Kinoshita | |

FOREIGN PATENT DOCUMENTS

| | | |
|---|---|---|
| EP | 0647556 A2 | 4/1995 |
| EP | 1524179 A2 | 4/2005 |
| JP | A-09-24876 | 1/1997 |

* cited by examiner

*Primary Examiner*—Benjamin C Lee
*Assistant Examiner*—Samuel J Walk
(74) *Attorney, Agent, or Firm*—Global IP Counselors, LLP

(57) ABSTRACT

A bicycle display device is configured to accurately verify an amount of adjustment occurring when performing a fine adjustment of a transmission position of a transmission device. The bicycle display device is mounted on a bicycle, and includes a mounting part and a display element. The mounting part is attachable to a brake bracket of the bicycle. The display element is supported by the mounting part, and is configured and arranged to display a fine adjustment display screen for indicating the amount of adjustment when adjusting the transmission position of a transmission device such as a rear derailleur.

18 Claims, 13 Drawing Sheets

BICYCLE DISPLAY DEVICE

CROSS-REFERENCE TO RELATED APPLICATIONS

This application claims priority under 35 U.S.C. §119 to Japanese Patent Application No. 2005-242695, filed Aug. 24, 2005 and Japanese Patent Application No. 2006-017463, filed Jan. 26, 2006. The entire disclosures of Japanese Patent Application Nos. 2005-242695 and 2006-017463 are hereby incorporated herein by reference.

BACKGROUND OF THE INVENTION

1. Field of the Invention

This invention generally relates to a bicycle display device configured to be mounted on a bicycle. More specifically, the present invention relates a bicycle display device that indicates an amount of adjustment when adjusting a transmission position of a transmission device such as a rear derailleur.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Currently, many bicycles are equipped with a display device that is mounted on a handlebar for displaying a transmission position (see, for example, Japanese Laid-Open Patent Publication No. 09-024876). Conventional bicycle display devices are sometimes fixed to a brake bracket that is mounted on the handlebar. A rider can be instantly alerted to the transmission gear ratio via such a display of the transmission position, and can rapidly perform gear shifting operations in accordance with changes in road conditions.

When the positional relationship between the sprocket and chain guide moving in the axial direction is misaligned in such transmission devices, and particularly in externally mounted transmission devices, the chain chatters and shifting can not be accomplished smoothly. To prevent this occurrence, consideration has been given to making fine adjustments of the position of the chain guide relative to the sprocket (e.g., by electrically actuating the chain guide in an electrically-driven derailleur capable of electrically controlling a derailleur).

When the amount of adjustment of the transmission gear position can not be correctly perceived when making this fine adjustment, the amount of completed adjustment, or the amount of possible further adjustment after this adjustment can not be known, such that the fine adjustment operation requires considerable time. Particularly when performing this fine adjustment while riding, the fine adjustment operation may cause delay since it is difficult to directly verify the chain guide position by visual inspection.

Furthermore, when the operation part for entering the fine adjustment mode to perform the fine adjustment of the chain guide is placed near the hand that performs the gear shifting operation, such as on the handlebar or the like, there is concern of mistakenly entering the fine adjustment mode by misoperation when shifting gears. When the fine adjustment mode is entered while operating the bicycle, the rider can not perform the gear shifting operation, and there is concern of devastating time loss, particularly when such misoperation occurs during a race.

In view of the above, it will be apparent to those skilled in the art from this disclosure that there exists a need for an improved bicycle display device. This invention addresses this need in the art as well as other needs, which will become apparent to those skilled in the art from this disclosure.

SUMMARY OF THE INVENTION

One object of the present invention is to provide a bicycle display device that allows the amount of adjustment to be accurately known when performing the work of fine adjustment of the transmission position.

Another object of the present invention is to make it difficult to perform the misoperation of mistakenly setting the fine adjustment mode for performing fine adjustment of the transmission device.

In accordance with a first aspect of the present invention, the foregoing objects can basically be attained by providing a bicycle display device that includes a mounting part and a display element. The mounting part is configured and arranged to be attached to a bicycle. The display element is supported on the mounting part. The display element is configured and arranged to display a fine adjustment display screen that indicates an adjustment amount occurring during fine adjustment of a transmission position of a bicycle transmission device.

The fine adjustment display screen for fine adjustment of the transmission position is displayed on the display element of the display device. In this case, since the amount of adjustment during the fine adjustment work is displayed on the fine adjustment display screen displayed on the display element, the amount of adjustment can be accurately ascertained by viewing the fine adjustment display screen while making the fine adjustment of the transmission position. Therefore, performing the fine adjustment operation while confirming the amount of adjustment is relatively simple even while the bicycle is being ridden.

The bicycle display device in accordance with a second aspect of the present invention provides the bicycle display device of the first aspect of the present invention with the display element being configured and arranged to switch between the fine adjustment display screen and a transmission position display screen that indicates a current transmission position of the bicycle transmission device. In this case, not only can the amount of adjustment be verified on the fine adjustment display screen, but the transmission position can also be confirmed while riding simply by switching the screens of the display.

The bicycle display device in accordance with a third aspect of the present invention provides the bicycle display device of the second aspect of the present invention with a display controller that is configured and arranged to control the display element, and to switch the display screen of the display element between the fine adjustment display screen and the transmission position display screen in accordance with a switching operation. In this case, the display screen can be simply switched by the display controller.

The bicycle display device in accordance with a fourth aspect of the present invention provides the bicycle display device of anyone of the first through third aspects of the present invention with the mounting part including a brake lever bracket that is configured and arranged to be detatchably installed on a handlebar of the bicycle. In this case, when a transmission operation part is provided on or near the brake lever, the transmission operation part and the display device can be disposed in proximity since the display device is attached to a bracket of the brake lever, thus the transmission position and adjustment amount are associated with the transmission device and can be quickly and readily confirmed. The bicycle display device in accordance with a fifth aspect of the present invention provides the bicycle display device of the fourth aspect of the present invention with the brake lever bracket being a drop handlebar mounting bracket. The display element is attached to a top surface of the drop handlebar mounting bracket. In this case, the display is easy to see even on a bicycle with a drop handlebar since the display device is mounted on the top surface of the bracket.

The bicycle display device in accordance with a sixth aspect of the present invention provides the bicycle display device of anyone of the first through fifth aspects of the present invention with the display controller being configured and arranged to display an adjustment direction in addition to the adjustment amount when the fine adjustment display screen is displayed. In this case, the fine adjustment operation can be understood with greater precision since not only the amount of adjustment but also the direction of adjustment are displayed.

The bicycle display device in accordance with a seventh aspect of the present invention provides the bicycle display device of the sixth aspect of the present invention with the display element having a numeric display region and a direction display region. The display controller displays the amount of adjustment in the numeric display region, and displays the adjustment direction in the direction display region when the fine adjustment display screen is displayed. In this case, the amount of adjustment can be instantaneously determined since the amount of adjustment is displayed numerically, and the direction of adjustment is easily determined since the adjustment direction is displayed separately.

The bicycle display device in accordance with an eighth aspect of the present invention provides the bicycle display device of the sixth aspect of the present invention with the display element being a dot matrix type display device. The display controller displays a diagram of the adjustment amount and adjustment direction of the transmission position on the dot matrix type display when the fine adjustment display screen is displayed. In this case, the two displays can be instantly verified since the adjustment amount and direction are displayed graphically.

The bicycle display device in accordance with a ninth aspect of the present invention provides the bicycle display device of anyone of the third through eighth aspects of the present invention with a screen switching operation part remotely connected to the display controller so that the screen switching operation part is provided near the bicycle transmission device. In this case, the screen switching operation can be performed by the rider even while riding since the front derailleur is disposed below the saddle.

The bicycle display device in accordance with a tenth aspect of the present invention provides the bicycle display device of anyone of the first through ninth aspects of the present invention with the display controller being configured and arranged to switch the fine adjustment display screen between displaying a rear derailleur adjustment and displaying a front derailleur adjustment depending on an amount of time that the screen switching operation part is operated. In this case, the switching operation is easily accomplished since the fine adjustment operations of the front derailleur and the rear derailleur can be performed by one operating part.

The bicycle display device in accordance with an eleventh aspect of the present invention provides the bicycle display device of anyone of the first through tenth aspects of the present invention with the transmission device is a rear derailleur. In this case, the amount of adjustment of the rear derailleur can be easily confirmed.

In accordance with a twelfth aspect of the present invention, a bicycle control device is provided that basically includes a mode operation part, a fine adjustment operation part, and a controller. The mode operation part is configured and arranged to set a fine adjustment mode to adjust a transmission position of at least one of a front derailleur and a rear derailleur. The fine adjustment operation part is configured and arranged to perform fine adjustment of the transmission position of the transmission device when in the fine adjustment mode. The controller is configured and arranged to control the fine adjustment of the transmission position of the transmission device when in the fine adjustment mode in accordance with operation of the fine adjustment operation part. The mode operation part includes at least one or another of a front derailleur or rear derailleur as the transmission device.

In this control device, the transmission position can be finely adjusted in accordance with the operation of the fine adjustment operation part when the mode operation part provided for at least one or another of the front derailleur and rear derailleur is operated to set the fine adjustment mode. The mode operation part that sets the fine adjustment mode is provided for at least one among the front derailleur or rear derailleur, and is disposed so as to make misoperation difficult while riding. In this case, since the mode operation part for setting the fine adjustment mode is provided for only one among the front derailleur or rear derailleur, it becomes difficult to operate the mode operation part while riding, and, therefore, erroneous operation of the mode operation part is difficult.

The bicycle control device in accordance with a thirteenth aspect of the present invention provides the bicycle control device in accordance with the twelfth aspect of the present invention with the mode operation part is provided on the front derailleur. In this case, the mode operation part can also be operated while riding by extending a hand since the front derailleur is disposed below the saddle.

The bicycle control device in accordance with a fourteenth aspect of the present invention provides the bicycle control device in accordance with the thirteenth aspect of the present invention with the control part being configured and arranged to perform fine adjustment of the transmission position of the rear derailleur in accordance with the operation of the fine adjustment operation part in the fine adjustment mode. In this case, fine adjustment of the rear derailleur can be accomplished even while riding.

The bicycle control device in accordance with a fifteenth aspect of the present invention provides the bicycle control device in accordance with the fourteenth aspect of the present invention with the controller including a front control section configured to control the front derailleur, and a rear control section configured to control the rear derailleur. The front control section is further configured to output fine adjustment mode information to the rear control section when the fine adjustment mode is set by operation of the mode operation part. The rear control section is further configured to control fine adjustment of the rear derailleur in accordance with the operation of the fine adjustment operation part when the fine adjustment mode information is received. In this case, the fine adjustment of the rear derailleur can be easily performed even when the mode operation part is provided on the front derailleur since the operation can be easily performed while riding.

The bicycle control device in accordance with a sixteenth aspect of the present invention provides the bicycle control device in accordance with the fifteenth aspect of the present invention with the mode operation part including an ON/OFF switch that is configured to operate the front control section to output fine adjustment mode information to the rear control section when the ON/OFF switch is turned ON less than a prescribed period of time. The ON/OFF switch is configured to control fine adjustment of the front derailleur in accordance with the operation of the fine adjustment operation part when the ON/OFF switch is turned on longer than a predetermined time. In this case, the front derailleur can be finely adjusted in addition to the rear derailleur in accordance with the ON operation time of the ON/OFF switch employed as the mode operation switch.

The bicycle control device in accordance with a seventeenth aspect of the present invention provides the bicycle control device in accordance with anyone of the twelfth through sixteenth aspects of the present invention with a bicycle display device including a mounting part configured and arranged to be attached to a bicycle, a display element supported on the mounting part and controlled by the controller. The display element is configured and arranged to display a fine adjustment display screen that indicates an adjustment amount occurring during fine adjustment of a transmission position of a bicycle transmission device. The controller is configured to switch the display screen of the display element between the fine adjustment display screen and a transmission position display screen in accordance with operation of the mode operation part. In this case, when the fine adjustment mode is set and fine adjustment of the transmission position is being performed, the amount of adjustment can be accurately confirmed by viewing the fine adjustment display screen since the amount of adjustment is displayed on the fine adjustment display screen displayed on the display element during the fine adjustment operation. Therefore, performing the fine adjustment operation while confirming the amount of adjustment is relatively simple even while the bicycle is being ridden.

The bicycle control device in accordance with an eighteenth aspect of the present invention provides the bicycle control device in accordance with anyone of the twelfth through seventeenth aspects of the present invention with the controller being configured to cancel the fine adjustment mode when a predetermined time has elapsed after the fine adjustment mode has been set by an operation of the mode operation part. In this case, operational quality is improved because it becomes unnecessary to perform a fine adjustment mode release operation when the fine adjustment mode has been set by an operation of the mode operation part.

According to the present invention, since the amount of adjustment during the fine adjustment operation is shown on the fine adjustment display screen displayed on the display element, the amount of adjustment can be accurately ascertained by viewing the fine adjustment display screen while making the fine adjustment of the transmission position. Therefore, performing the fine adjustment operation while confirming the amount of adjustment is relatively simple even while the bicycle is being ridden.

According to another invention of the present invention, since the mode operation part for setting the fine adjustment mode is provided for only one among the front derailleur or rear derailleur, it becomes difficult to operate the mode operation part while riding, and, therefore, erroneous operation of the mode operation part is difficult.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
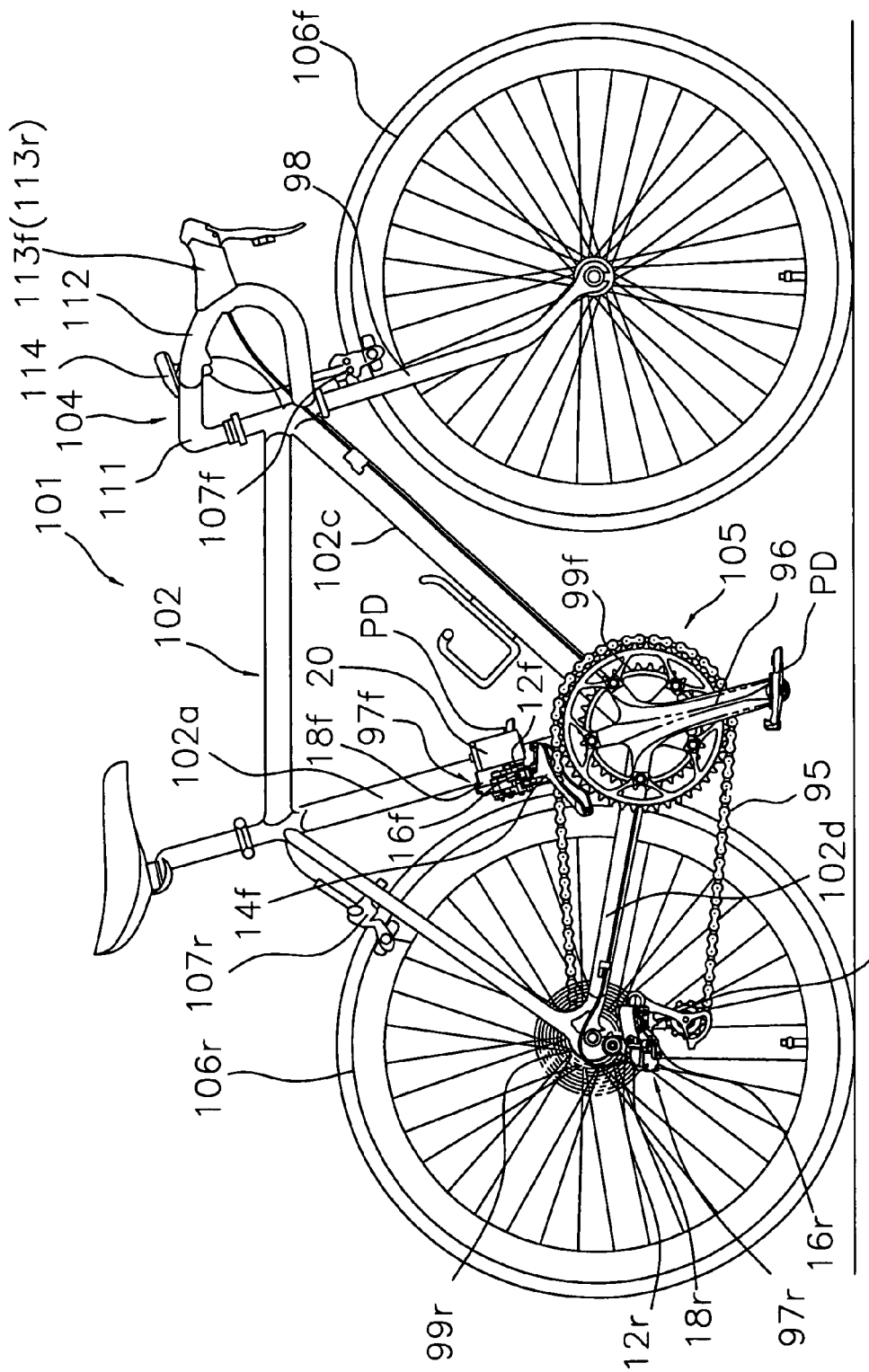
FIG. 1 is a right side elevational view of a bicycle using a bicycle control device in accordance with one embodiment of the present invention.

Referring initially to FIG. 1, a bicycle 101 is illustrated in accordance with a first embodiment of the present invention. As seen in FIG. 1, the bicycle 101 is a "road racer" (racing style road bike) that basically comprises a diamond shaped frame 102, a handlebar unit 104, a drive unit 105, a pair of front and rear wheels 106f and 106r, a pair of front and rear brake devices 107f and 107r and a variable speed gearshift device 110. The diamond shaped frame 102 has a front fork 98 to which the handlebar unit 104 is fastened. The drive unit 105 basically includes a chain 95, a crank 96 with a pair of pedals PD, a pair of motorized front and rear derailleurs 97*f* and 97*r*, a pair of front and rear sprocket sets 99*f* and 99*r*, and other conventional components. The front and rear wheels 106*f* and 106*r* are installed on the front fork 98 and the rear side of the frame 102, respectively, as seen in FIG. 1.

Figure 2:
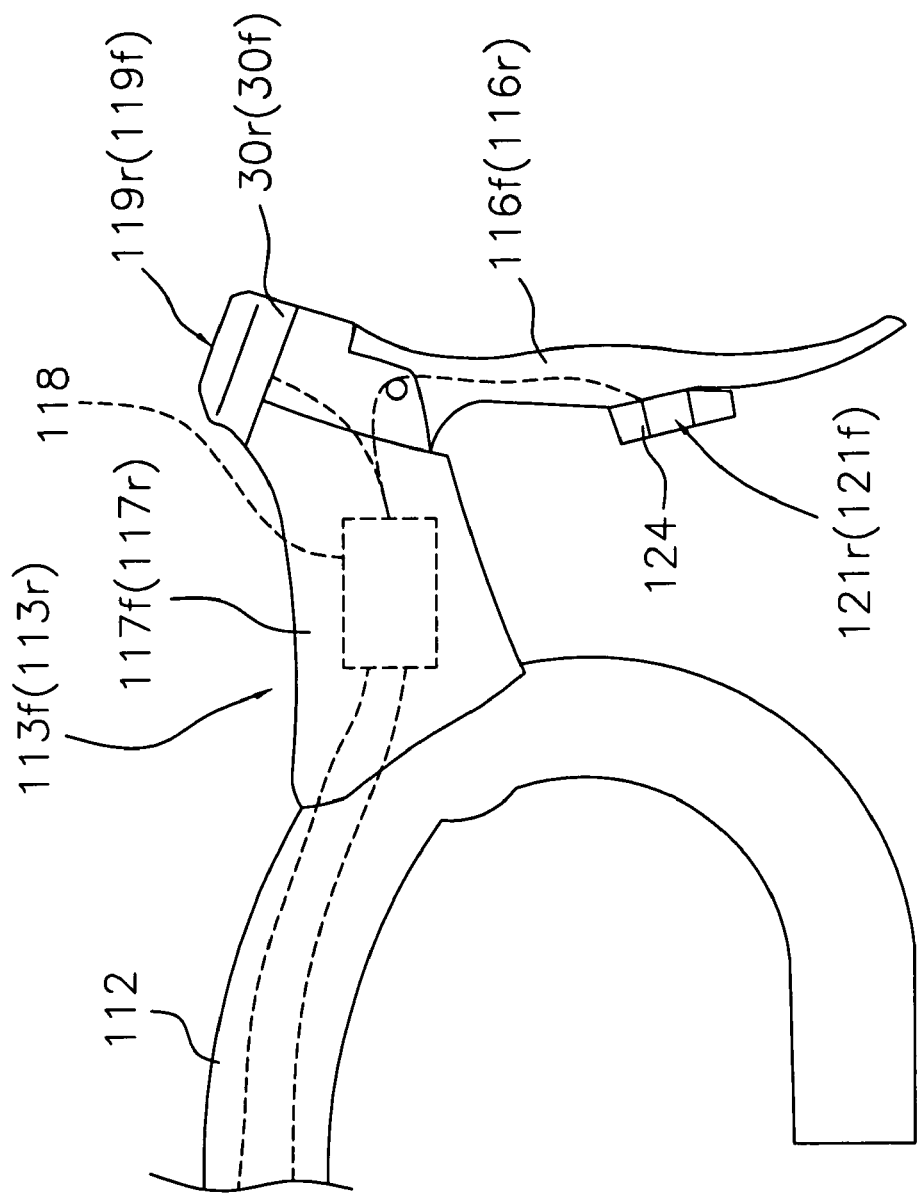
FIG. 2 is an enlarged, partial side elevational view around the handle end of the bicycle illustrated in FIG. 1 with the bicycle control device in accordance with one embodiment of the present invention.

As seen in FIG. 2, the handlebar unit 104 includes a handlebar stem 111, and a handlebar 112 fixedly coupled to the upper end of the handlebar stem 111. The handlebar stem 111 is fixedly coupled to an upper end of the front fork 98. The handlebar 112 is a drop handle type handlebar equipped with left and right brake levers 113*f* and 113*r* for operating the front and rear brake devices 107*f* and 107*r*, respectively. The brake lever 113*f* is disposed at the right end part of the handlebar 112, and the brake lever 113*r* is disposed at the left end part when the bicycle 101 is viewed from behind. As seen in FIG. 1, a speed display element 114 is disposed in the center part of the handlebar 112 for displaying the distance covered and speed of the bicycle.

Figure 3:
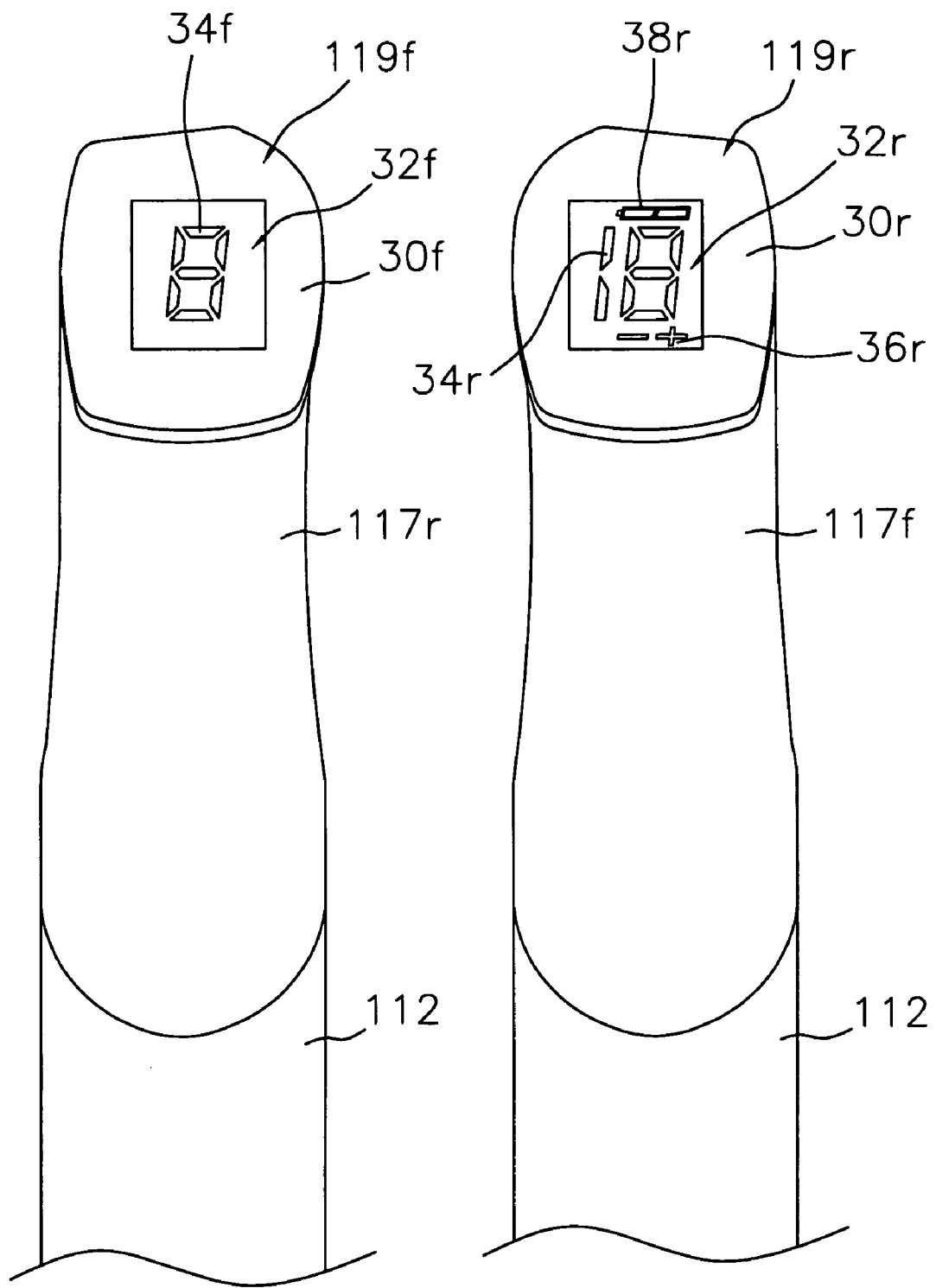
FIG. 3 is an enlarged, partial top plan of view the left and right bicycle control devices in accordance with one embodiment of the present invention.

As shown in FIGS. 2 and 3, the brake levers 113*f* and 113*r* have front and rear brake brackets 117*f* and 117*r*, respectively, mounted on the ends of the handlebar 112, respectively, and front and rear brake lever members 116*f* and 116*r* are swiveably installed in the brake brackets 115*f* and 115*r*, respectively.

As shown in FIG. 2, the front brake lever 113*f* has a front lever member 116*f* and a front brake bracket 117*f*. The front brake bracket 117*f* is mounted on one the end of the handlebar 112, with the front lever member 116*f* pivotally mounted on the front brake bracket 117*f* so as to be pivoted relative to the handlebar 112. Similarly, the rear brake lever 113*r* has a rear lever member 116*r* and a rear brake bracket 117*r*. The rear brake bracket 117*r* is mounted on the opposite end of the handlebar 112 from the front brake lever 113*f*, with the rear lever member 116*r* pivotally mounted on the rear brake bracket 117*r* so as to be pivoted relative to the handlebar 112.

Furthermore, one of the brake levers 113*f* and 113*r* is provided with a display controller 118, while the front brake lever 113*f* is provided with a transmission display device 119*f* and the rear brake lever 113*r* is provided with a transmission display device 119*r*. In the illustrated embodiment, as shown in FIG. 2, the display controller 118 is provided on an inner part of the brake bracket 117*f* for controlling the display of information on the transmission display devices 119*f* and 119*r*. The display controller 118 controls the displays of the display elements 32*f* and 32*r*, and switches the display screen of the display element 32*r* between the transmission position display screen shown in FIG. 8, and the fine adjustment display screen shown in FIG. 9 in accordance with the ON/OFF status of the adjustment mode.

Front and rear transmission (derailleur) operating devices 121*f* and 121*r* are mounted separately on the back surface of the lever members 116*f* and 116*r*, respectively. The front and rear transmission operating devices 121*f* and 121*r* are used for performing the gear shifting operations of the front and rear derailleurs 97*f* and 97*r*, respectively. Specifically, the transmission operating device 121*f* for the front derailleur 97*f* is provided on the lever member 116*r* that initiates the braking operation of the rear brake device 107*r*, and the transmission operating device 121*r* for the rear derailleur 97*r* is provided on the lever member 116*f* that initiates the braking operation of the front derailleur 97*f*. Furthermore, the transmission display devices 119*r* and 119*f* are mounted on the top leading end surface of the brake brackets 117*f* and 117*r* for displaying the transmission position and the amount of adjustment and adjustment direction in an adjustment mode described later.

Specifically, the transmission display device 119*r* displays the rear transmission position of the rear derailleur 97*r*. The transmission display device 119*r* is mounted on the brake bracket 117*f* of the front brake lever 113*f*. The transmission display device 119*f* displays the front transmission position of the front derailleur 97*f*. The transmission display device 119*f* is mounted on the brake bracket 117*r* of the rear brake lever 113*r* in accordance with the transmission operating device 121*r*. Of course, it will be apparent to those skilled in the art that the transmission display devices 119*r* and 119*f* can be mounted on the opposite ones of the brake levers 113*r* and 113*f* as need and/or desired.

The transmission display devices 119*f* and 119*r* are mountable on the top end surface of the brake brackets 117*r* and 117*f*, as shown in FIGS. 2 and 3, with both of the transmission display devices 119*f* and 119*r* operatively connected to the display controller 118. The transmission display device 119*f* has, for example, a case-shaped mounting part 30*f* and a display element 32*f* supported by the mounting part 30*f*. Similarly, the transmission display device 119*r* has, for example, a case-shaped mounting part 30*r* and a display element 32*r* supported by the mounting part 30*r*. The mounting parts 30*f* and 30*r* are attached by a suitable mounting means, for example, screw anchor, adhesive, band anchor or the like on the end part of the brake levers 117*r* and 117*f*, respectively. The display elements 32*f* and 32*r* are preferably configured as segment-type liquid crystal display devices that display numerals and graphics and turn ON/OFF predetermined graphics. Of course, it will be apparent to those skilled in the art from this disclosure that other types of displays can be used.

Figure 8:
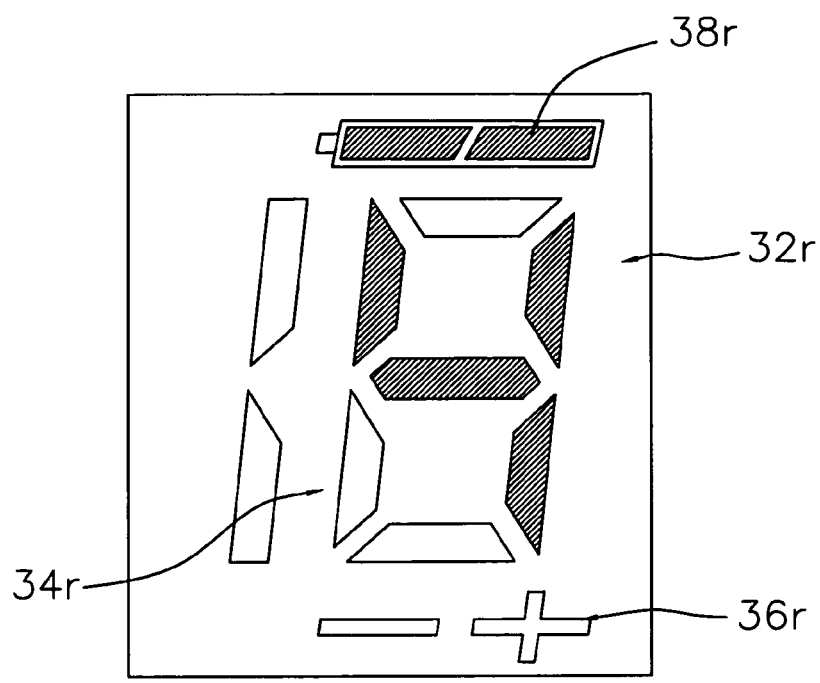
FIG. 8 is an enlarged top plan view of the transmission position display screen in accordance with one embodiment of the present invention.
Figure 9:
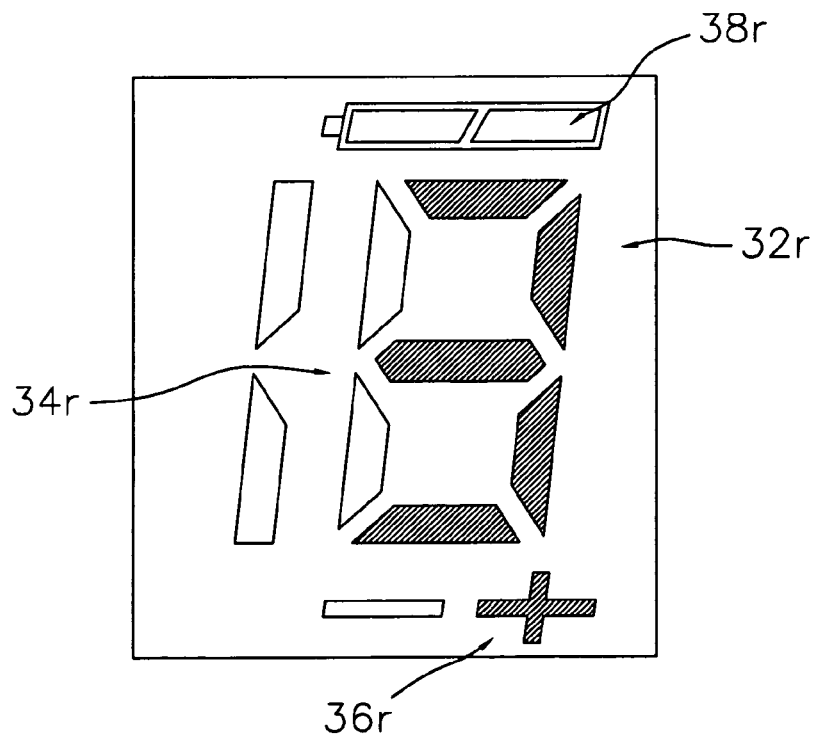
FIG. 9 is an enlarged top plan view of the fine adjustment display screen in accordance with one embodiment of the present invention.

The display element 32*f* for the front derailleur 97*f* preferably has a seven segment numeric display region 34*f* for displaying numeric symbols, for example, to indicate a current transmission position of the front derailleur 97*f*. The display element 32*r* for the rear derailleur 97*f* is selectively switchable between a transmission position display screen and a fine adjustment display screen during the adjustment mode. The display element 32*r* preferably has three display regions, including a numeric display region 34*r*, a direction display region 36*r* and remaining power display region 38*r*. The numeric display region 34*r* is configured and arranged to display numbers up to the number 10, e.g., two LCD segments and seven LCD segments. The direction display region 36*r* is configured and arranged to display directional adjustment using plus and minus symbols. The remaining power display region 38*r* is configured and arranged to graphically display the remaining battery power. Normally, for example, the remaining power is displayed in the remaining power display region 38*r*, while the transmission (gear) position of the rear derailleur 97*r* is displayed numerically in the numeric display region 34*r*, as shown in FIG. 8. The remaining power display region 38*r* is preferably configured graphically and allocated into at least two blocks or LCD segments. Thus, the amount of remaining power of a power supply 20 can be displayed, for example, in at least two blocks or LCD segments. Alternatively, the amount of remaining power of the power supply 20 can be displayed, for example, using only one block or LCD segment, or using a three-level display with the display of the block(s) ON, the block(s) flashing, and/or block(s) OFF. In the adjustment mode, the amount of adjustment in the fine adjustment operation is preferably displayed numerically in 10-levels, and the adjustment direction is displayed as either a plus or minus symbol, as shown in FIG. 9. In this case, the minus symbol, for example, indicates an adjustment direction on the low side (the side of the large diameter sprocket side in the sprocket set 99*r*), and the plus symbol, for example, indicates an adjustment direction on the top side (the side of the small diameter sprocket of the sprocket set 99r).

Figure 4:
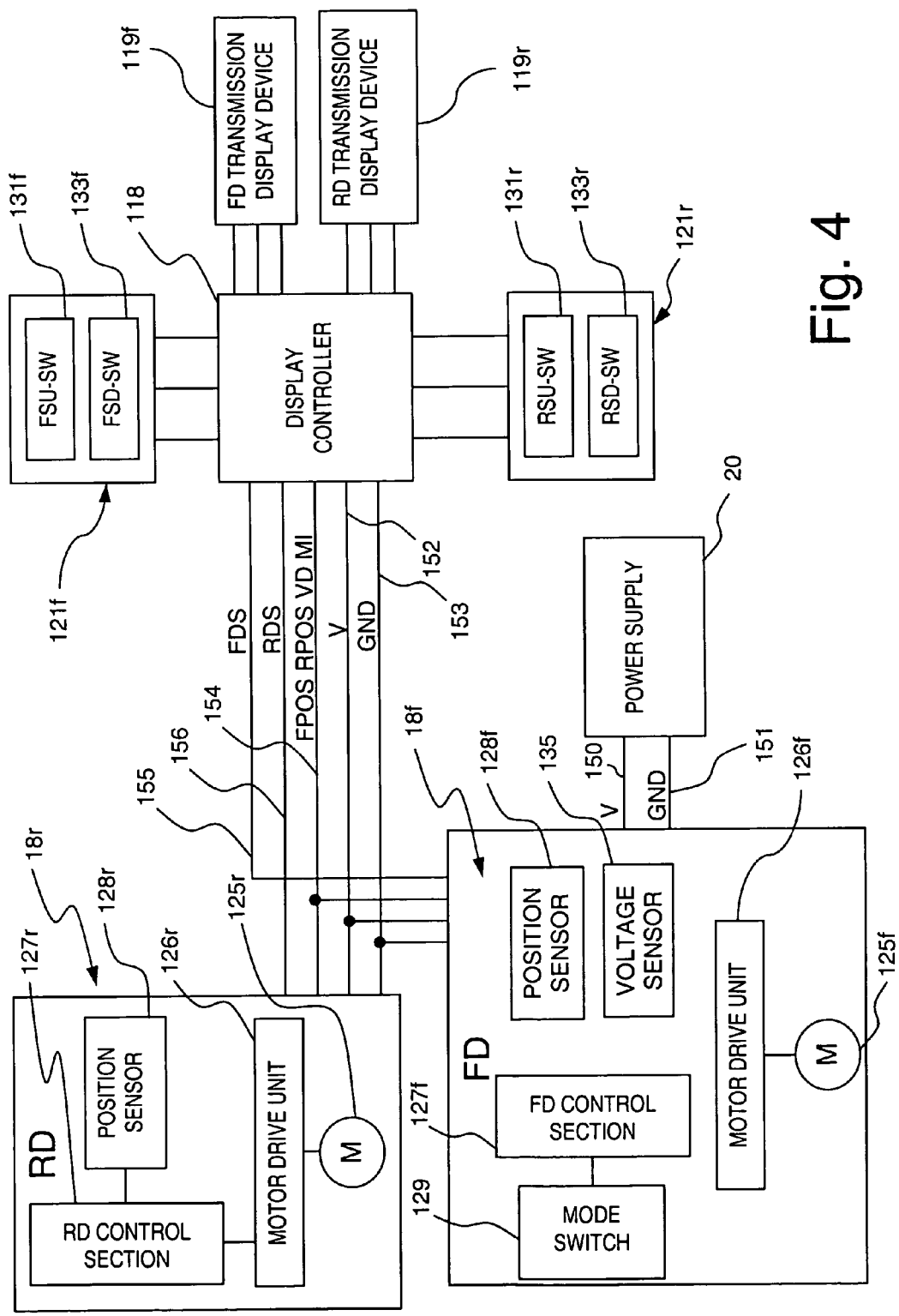
FIG. 4 is a block diagram showing an example of a structure of a transmission control system used with one embodiment of the present invention.

The transmission operating devices 121f and 121r each have a respective transmission lever 124 mounted on the back surface of the lever members 116r and 116f so as to freely pivot. As shown in FIG. 4, the transmission operating device 121f is internally provided with a front shift-up switch (FSU-SW) 131f and a front shift-down switch (FSD-SW) 133f that are turned ON/OFF in accordance with the oscillation of the transmission lever 124. The transmission operating device 121r is similarly internally provided with a rear shift-up switch (RSU-SW) 131r, and rear shift-down switch (RSD-SW) 133r.

The drive unit 105 includes the previously mentioned chain 95, the derailleurs 97f and 97r with the looped chain, and the front and rear sprocket sets 99f and 99r.

Figure 11:
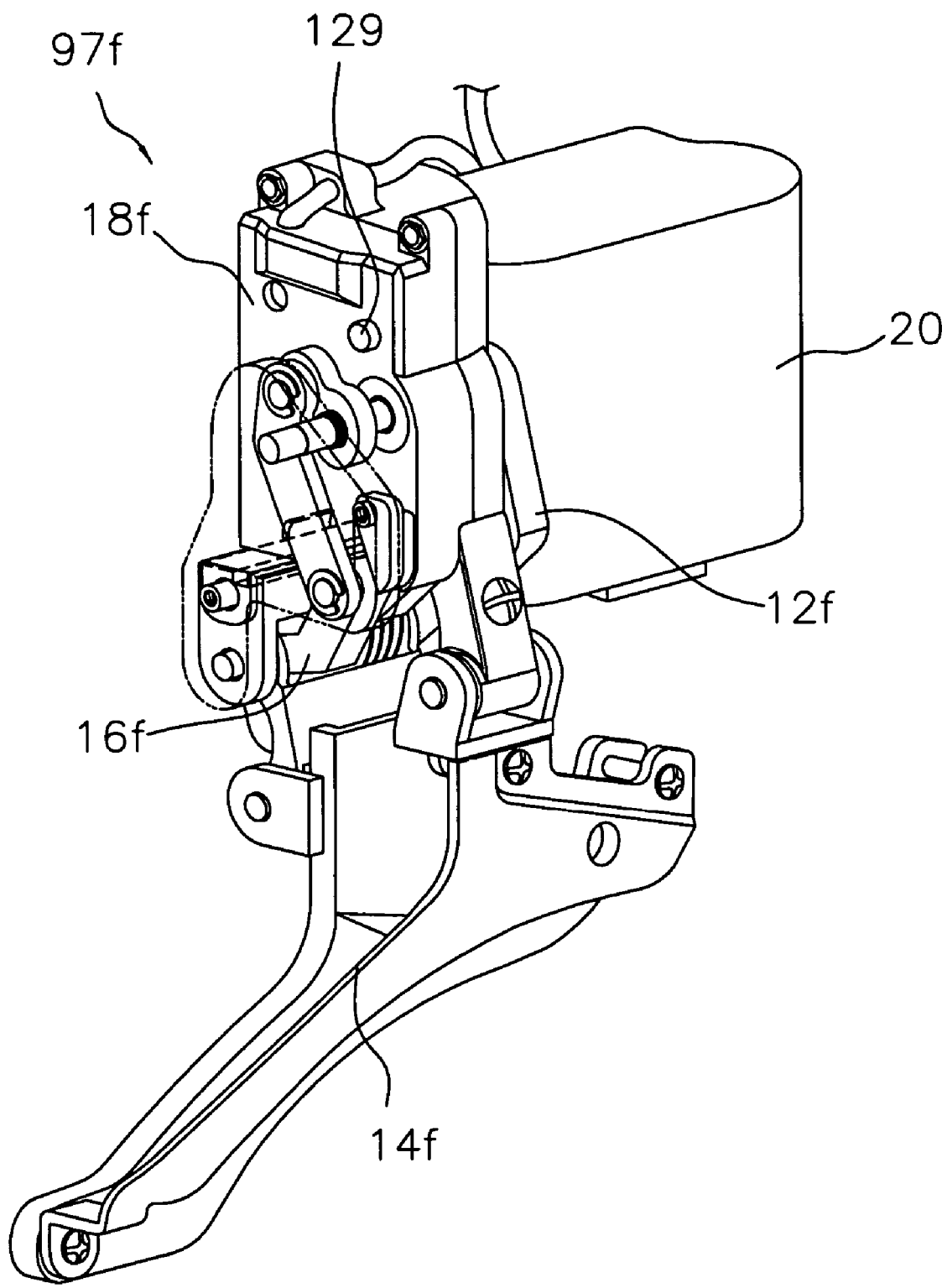
FIG. 11 is a perspective view of a motorized front derailleur used in conjunction with the front bicycle control device in accordance with the present invention.
Figure 12:
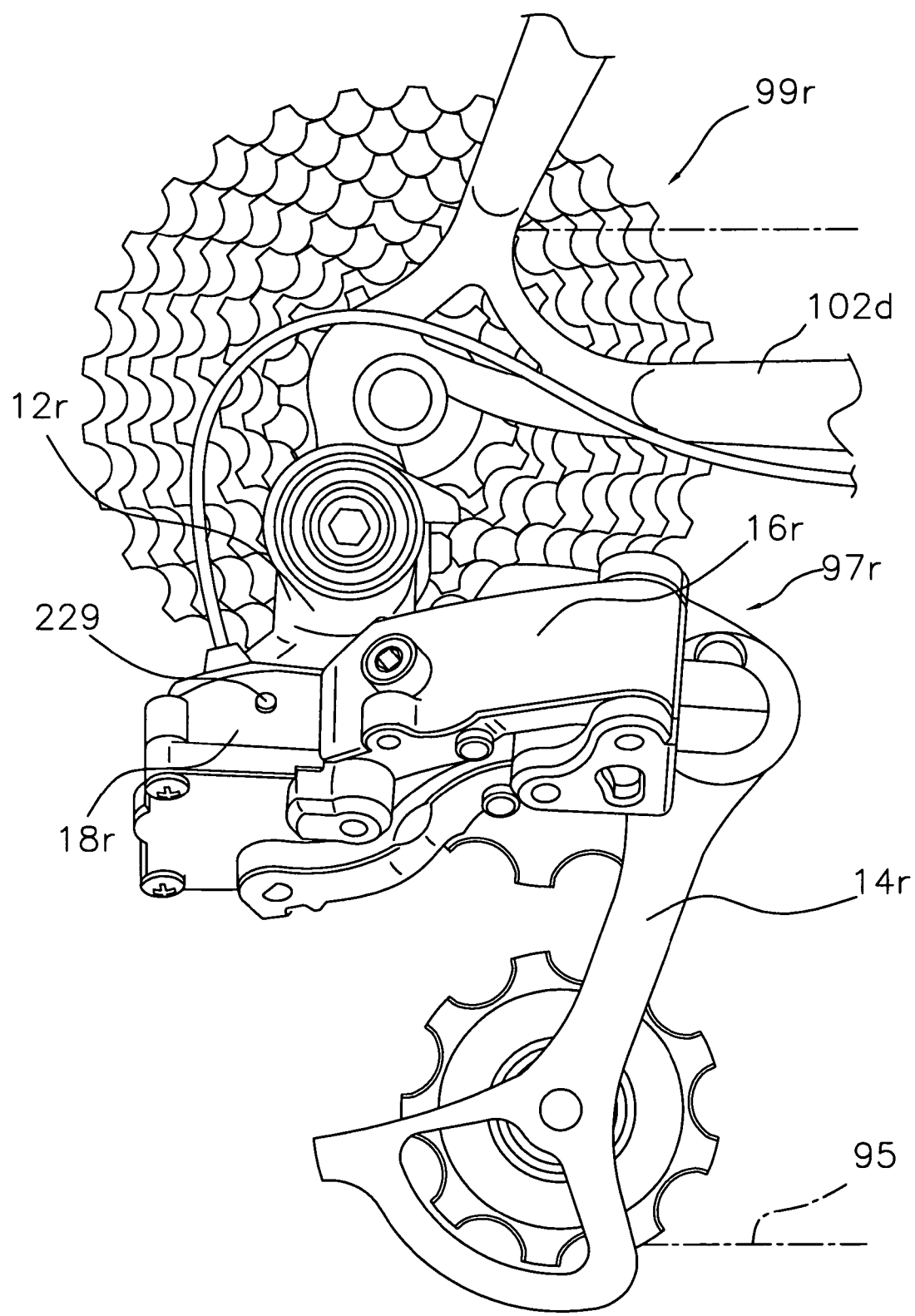
FIG. 12 is a perspective view of a motorized rear derailleur used in conjunction with the front bicycle control device in accordance with the present invention.

The front derailleur (FD) 97f is an electrically controllable electrically-driven derailleur that guides the chain 95 among a plurality (desirably two) transmission positions. The front derailleur 97f basically includes a mounting member 12f, a chain guide 14f, a four bar link mechanism 16f and an electrically driven drive part 18f. The mounting member 12f is attached to a seat tube 102a of the frame 102. The chain guide 14f is movable in directions approaching and retracting from the mounting member 12f. The link mechanism 16f connects the mounting member 12f and the chain guide 14f. The electrically driven drive part 18f is configured and arranged for driving the chain guide 14f via the link mechanism 14f. In the illustrated embodiment, the power supply 20 is attached electrically driven drive part 18f. The power supply 20 is configured and arranged to supply power to the electrically driven drive part 18f and other electric devices, as shown in FIGS. 1 and 11.

The electrically driven drive part 18f is internally provided with a motor 125f, a motor drive unit 126f, a front control section 127f (FD control part) for controlling the motor drive unit 126f, a position sensor 128f, a mode switch (an example of the screen switching operation part and the mode operation part) 129, and a voltage sensor 135, as shown in FIG. 4. The mode switch 129 is provided on a surface on the side opposite of the power drive part 18f in the advancing direction of the bicycle. When the mode switch 129 is provided at such a position, the adjustment mode can be set by extending the hand to operate the mode switch 129 even when fine adjustment becomes necessary due to poor transmission efficiency while riding.

As shown in FIG. 1, the rear derailleur (RD) 97r is an electrically controlled electrically driven derailleur that guides the chain 95 to one of a plurality (desirably ten) transmission positions. The rear derailleur 97r is provided with a mounting member 12r attached to the rear part of a chain stay 102d of the frame 102, chain guide 14r that is movable relative to the mounting member 12r, the link mechanism 16r connecting the mounting member 12r and the chain guide 14r, and electrically driven drive part 18r for driving the chain guide 14r via the link mechanism 14r.

The electrically driven drive part 18r is internally provided with a motor 125r, a motor drive unit 126r, a rear control section 127r (RD control part) for controlling the motor drive unit 126r, and a position sensor 128r for detecting the transmission position, as shown in FIG. 4.

In this case, the front and rear motor drive units 126f and 126r include a deceleration unit for decelerating the rotation of the motors 125f and 125r, and a motor driver. The front and rear control sections 127f and 127r respectively have a control circuit that includes a microcomputer with a calculation part and memory part and the like, and separately control the motor drive units 126f and 126r in accordance with transmission signals output from the transmission operating devices 121f and 121r via software. The front and rear position sensors 128f and 128r are sensors using, for example, a rotary encoder or the like to detect the transmission position of the derailleurs 97f and 97r. The mode switch 129 is, for example, a pushbutton switch that is turned on during a pressing operation, and is a switch for turning ON/OFF the adjustment mode (an example of the fine adjustment mode) for finely adjusting each transmission position of the rear derailleur 97r, and turns the adjustment mode ON or OFF each time it is turned ON. The voltage sensor 135 detects the power voltage of the power supply 20.

Each part of the derailleurs 97f and 97r, the transmission operating devices 121f and 121r, the display controller 118, and the front and rear transmission display devices 119f and 119r are supplied electric power from the power supply 20 mounted on the front derailleur 97f, as shown in FIG. 4. Specifically, for example, a DC (direct current) power supply voltage of approximately 6-8.4 volts V is supplied from the power supply 20 to the electrically driven drive part 18f of the front derailleur 97f via a power lead 150 and a ground wire 151. Furthermore, the power supply voltage V is supplied from the power supply drive part 18f to the electrically driven drive part 18r and the display controller 118 of the rear derailleur 97r via the power lead 152 and the ground wire 153. The power supply voltage V is also supplied to the front and rear transmission display devices 119f and 119r, and to the front and rear transmission operating devices 121f and 121r via the display controller 118.

Transmission signals FPOS and RPOS of the front and rear position sensors 128f and 128r are output to the display controller 118 through the position signals leads 154 and converted to display signals by the display controller 118. The transmission positions of the front and rear derailleur 97f and 97r are displayed on the front and rear transmission display devices 119f and 119r. Mode information (MI; information indicating whether or not the adjustment mode is set) and voltage information (VD; for example, three-level voltage information relative to the operation of the mode switch 129) are also output to the position signal lead 154. The transmission signals FDS and RDS are outputted to the front and rear derailleurs 97f and 97r through the display controller 118 and the respective transmission signal leads 155 and 156 in accordance with the operation of the transmission operating devices 121f and 121r. The transmission signal lead 156 of the transmission signal RDS is actually connected to the electrically driven drive part 18r through the electrically driven drive part 18f. Therefore, the electrically driven drive part 18f of the front derailleur 97f is connected to the display controller 118 via a five-conductor line, for example, through the down tube 102c, and the electrically driven drive part 18r is connected with the electrically driven drive part 18r via a four-conductor line, for example, through the chain stay 102d. Therefore, the five conductor leads can be bundled and provided with a connector for connecting to the electrically driven drive part 18f.

Figure 5:
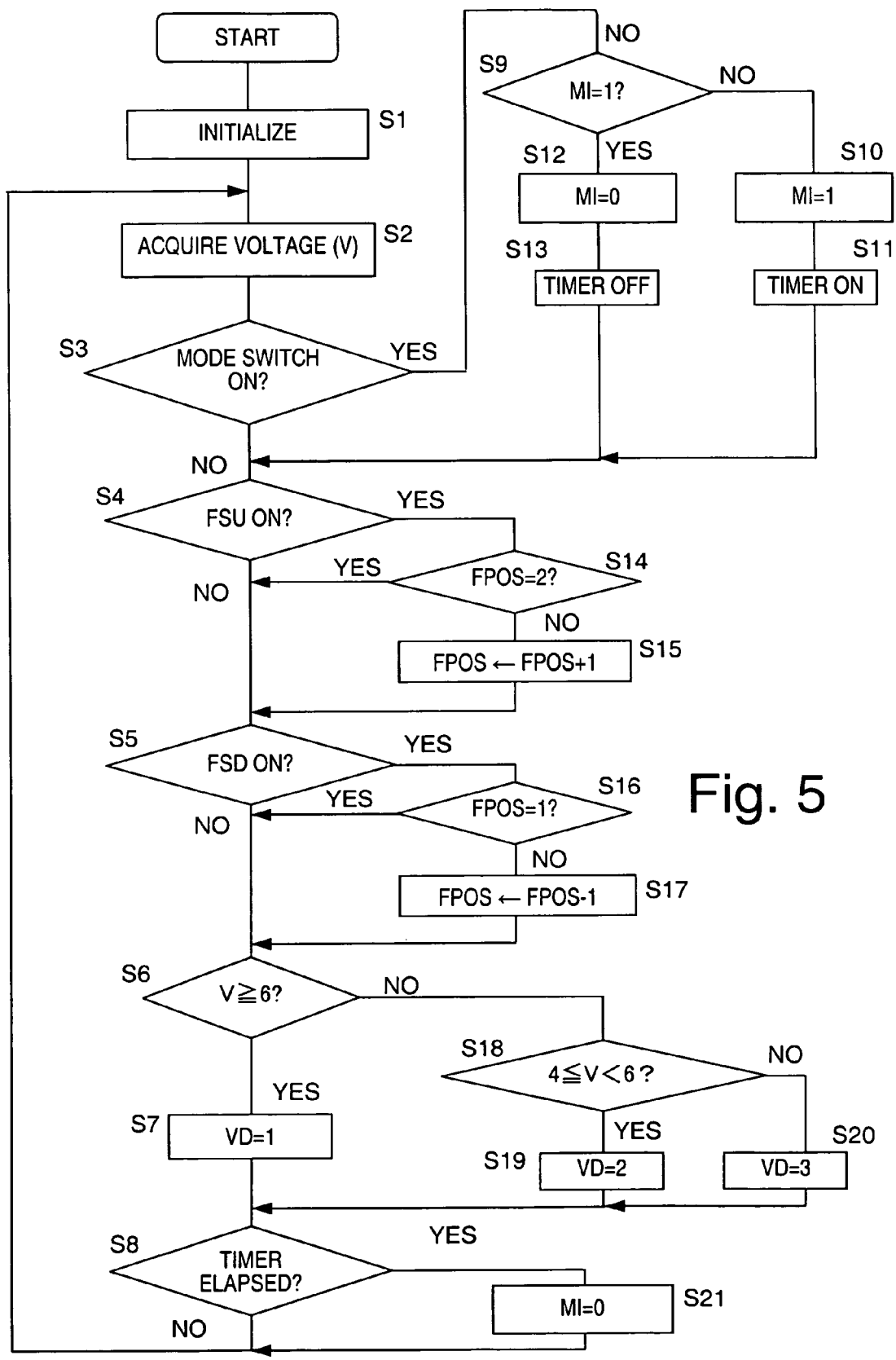
FIG. 5 is a flow chart showing the processing of the control executed by the front control section.
Figure 6:
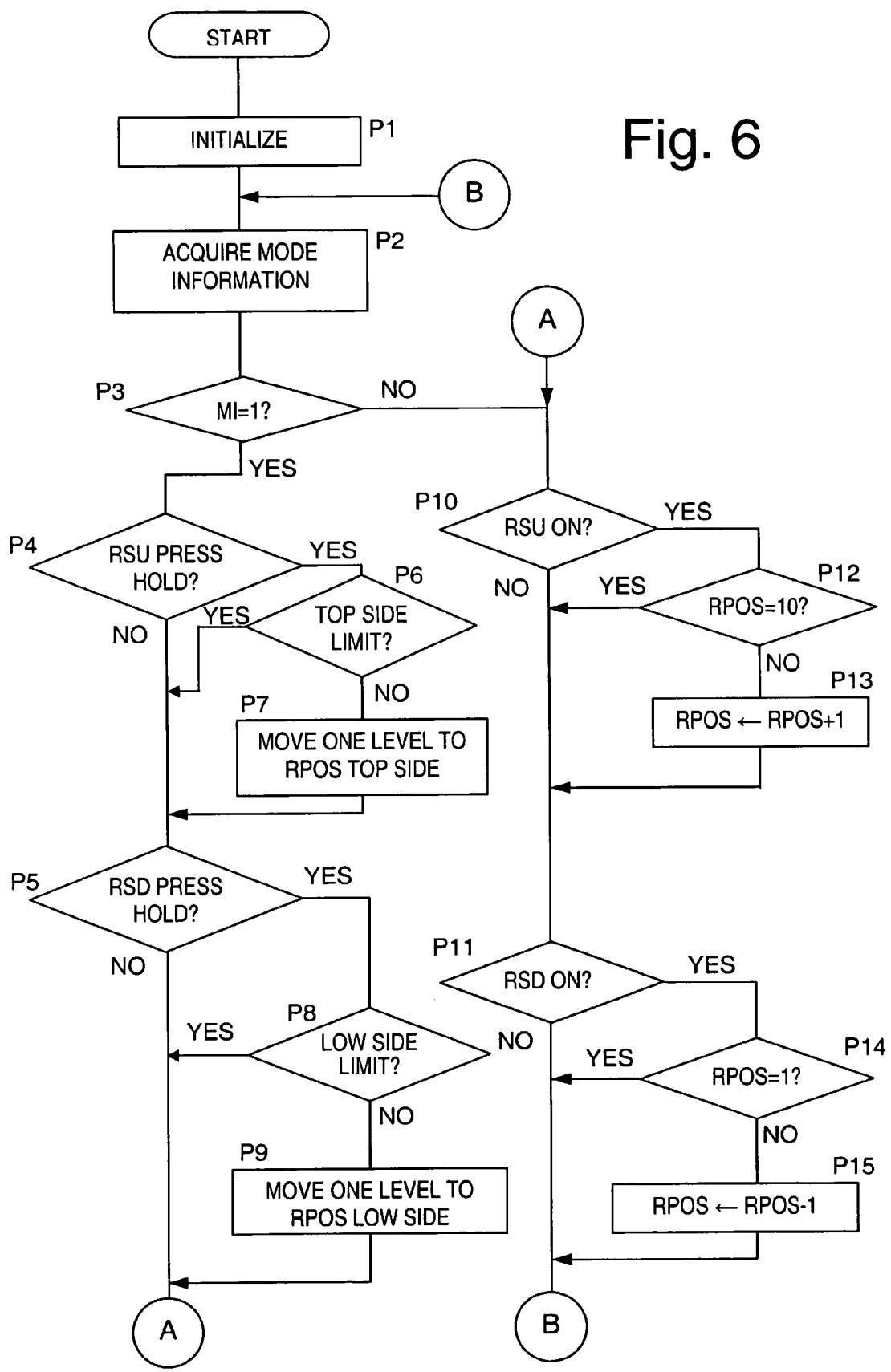
FIG. 6 is a flow chart showing the processing of the control executed by the rear control section.
Figure 7:
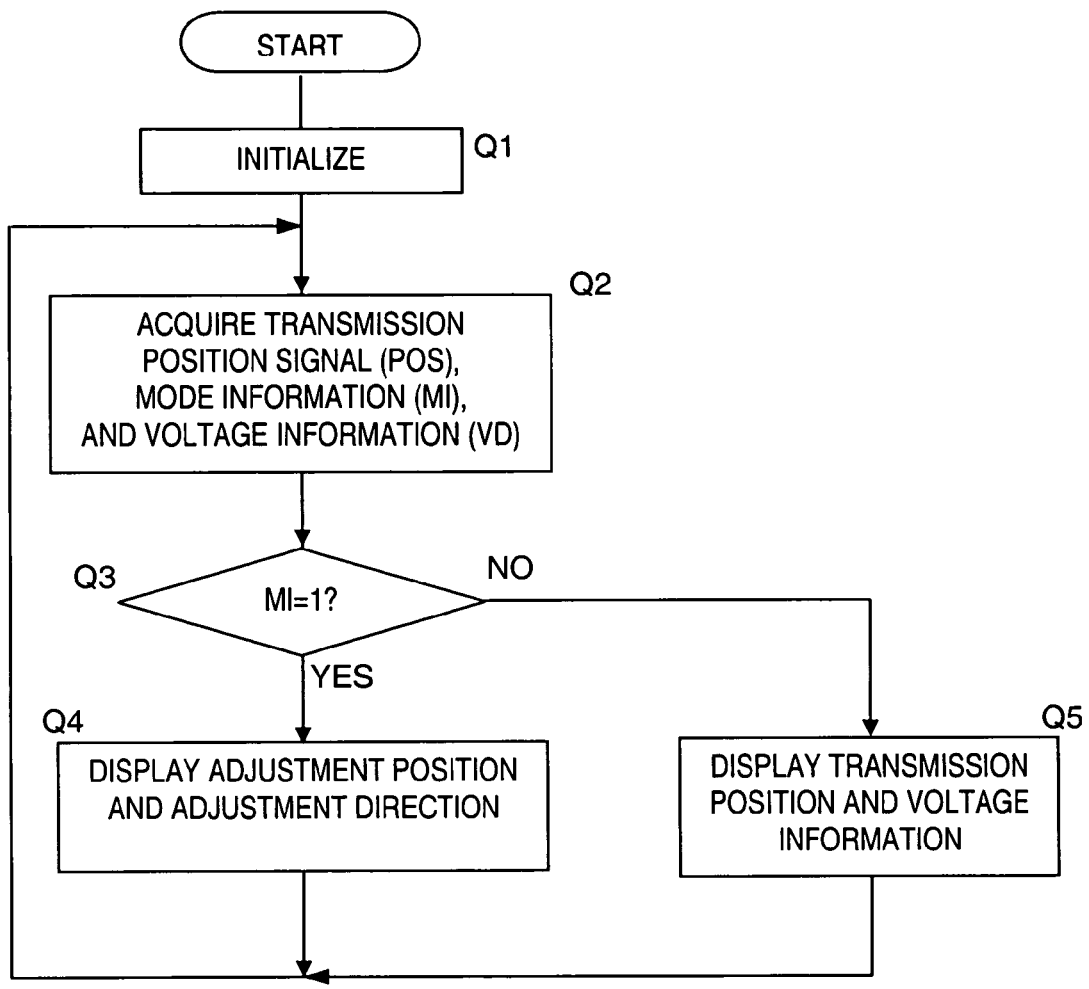
FIG. 7 is a flow chart the processing of the control executed by the display controller.

A summary of the control process performed by the control parts 127f and 172r will now be described. The following description is an example of the control process, and the control process of the present invention is not limited to the following examples. Basically, the processes illustrated in FIGS. 5, 6 and 7 are all preferably initialized when the power supply is turned ON. Thus, preferably, the processes illustrated in FIGS. 5, 6 and 7 are all concurrently executed.

When the power supply is turned ON, the front control section 127f is initialized in step S1, as shown in FIG. 5. This initialization initializes the various types of flags and variables. In step S2, the power supply voltage V is acquired via the output of the voltage sensor 135. In step S3, a determination is made as to whether or not the mode switch 129 has been turned ON. The mode switch 129 is a pushbutton type switch as previously mentioned, and is turned ON when pressed. In step S4, a determination is made as to whether or not the shift-up switch 131f of the front transmission operating device 121f has been turned ON. In step S5, a determination is made as to whether or not the shift-down switch 133f has been turned ON. In step S6, a determination is made as to whether or not the acquired power supply voltage V is 6 volts or more. When the power supply voltage V is 6 volts or more, the routine moves to step S7, and the voltage information VD is set to 1. In step S8, a determination is made as to whether or not the time has elapsed for a timer T set in step S11 described later. During the adjustment mode, the timer T regulates the time of the adjustment mode is displayed and operable until it is automatically cancelled, and is, for example, set for a duration of two minutes. When the time of the timer T has not elapsed, the routine returns to step S2.

When mode switch 129 has been turned ON, the routine jumps from step S3 to step S9. In step S9, a determination is made as to whether or not the mode information MI, which indicates that the adjustment mode is active, has already been set to 1. In other words, it is determined whether or not the adjustment mode is already set. When the adjustment mode is not active (MI=0), the routine proceeds to step S10 where the mode information MI is set to 1. Thus, the adjustment mode is set. In step S11, the timer T is turned ON and started, and then the routine proceeds to step S4. When the adjustment mode is active (MI=1), the routine proceeds from step S9 to step S12, and the mode information MI is set to 0. In step S13, the timer T is turned OFF and stopped. When this process ends, the routine moves to step S4.

When it is determined that the shift-up switch 131f is turned ON, the routine moves from step S4 to step S14. In step S14, a determination is made as to whether or not the transmission position signal FPOS is set to 2. The transmission position signal FPOS is variably between 1 and 2, for example. Signal values of 1 and 2 respectively indicate the low (small diameter sprocket) transmission position and high (large diameter sprocket) transmission position of the sprocket group 99f. The relationship between the transmission position signal FPOS and the output of the position sensor 128f is stored in the memory of the front control section 127f.

When the transmission position signal FPOS has the value 2, there is no further processing since the shift-up is not possible, and the routine moves to step S5. When the transmission position signal FPOS is not 2 (that is, when it is 1), the routine moves to step S15. In step S15, the transmission position signal FPOS is incremented 1 so as to be set at 2, and the routine moves to step S5. Thus, the motor 125f rotates, and the front derailleur 97f operates in the shift-up direction.

When it is determined that the shift-down switch 133f is turned ON, the routine jumps from step S5 to step S16. In step S16, a determination is made as to whether or not the transmission position signal FPOS is 1. When the transmission signal FPOS has the value 1, there is no further processing since the shift-down is not possible, and the routine moves to step S6. When the transmission position signal FPOS is not 1 (that is, when it is 2), the routine moves to step S17. In step S17, the transmission position signal FPOS is decremented 1 so as to be set at 1, and the routine moves to step S6. Thus, the motor 125f rotates, and the front derailleur 97f operates in the shift-down direction.

When the power supply voltage V is less than 6 volts, the routine jumps from step S6 to step S18. In step S18, a determination is made as to whether or not the power supply voltage V is 4 volts or more but less than 6 volts. When the power supply voltage is 4 volts or more but less than 6 volts, the routine moves to step S19, and the voltage information VD is set to 2. At other times, that is, when the power supply 20 is depleted and the power supply voltage is less than 4 volts such that the power supply 20 must be replaced, the routine moves to step S20, and the voltage information VD is set to 3. When this process ends, the routine moves to step S8. The three levels of remaining power based on the voltage information VD are displayed in the remaining power display region 38r of the transmission display device 119r.

When it is determined that the time of the time T has elapsed, that is, two minutes have passed since the adjustment mode started, the routine jumps from step S8 to step S21. In step S21, the mode information MI is set to 0. Thus, the adjustment mode is cancelled. As a result, the display screen is switched from the fine adjustment display screen of FIG. 9 to the transmission position display screen in the transmission display device 119r. When this process ends, the routine returns to step S2.

When the power supply is turned ON, the rear control section 127r is initialized in step P1, as shown in FIG. 6. In step P2, the mode information MI generated by the front control section 127f is acquired. In step P3, a determination is made as to whether or not the mode information MI is set to 1, that is, whether the adjustment mode is set. When the adjustment mode is set, the routine moves to step P4. In step P4, a determination is made as to whether or not the shift-up switch 131r of the rear transmission operating device 121r has been pressed and held, for example, for 0.5 or more seconds. In step P5, a determination is made as to whether or not the shift-down switch 133r of the rear transmission operating device 121r has been pressed and held, for example, for 0.5 or more seconds.

In the adjustment mode, for example, 10-level fine adjustment is possible to move each transmission position of the rear derailleur 97r between the top side (small diameter gear side) and the low side (large diameter gear side) by pressing and holding the shift-up switch 131r or shift-down switch 133r. The adjustment interval can be such that, for example, approximately ½ the distance of the interval L between adjacent sprockets in the 10-sprocket group 99r is divided into 10 equal parts from the top side to the low side. Therefore, in the adjustment mode, the fine adjustment positions allow adjustment of the transmission position of the rear derailleur 97r in 10-levels between the top side and the low side.

When it is determined that the shift-up switch 131r has been pressed and held, the routine moves from step P4 to step P6. In step P6, a determination is made as to whether or not fine adjustment has already reached the limit position on the top side, that is, the tenth level fine adjustment position has been reached. When adjustment has been made to the top side limit fine adjustment position, no further process can be performed and the routine moves to step P5. When adjustment has not yet reached the limit fine adjustment position, the routine moves to step P7, the rear derailleur 97r is moved to a fine adjustment position one level to the top side, and the transmission positions are changed to the fine adjustment positions one level to the top side in the respective ten transmission positions signals RPOS of the rear derailleur 97r.

Thus, all transmission positions are adjusted in a batch to fine adjustment positions one level to the top side.

When it is determined that the shift-down switch 133r has been pressed and held, the routine moves from step P5 to step P8. In step P8, a determination is made as to whether or not fine adjustment has already reached the limit position on the low side, that is, the tenth level fine adjustment position has been reached. When adjustment has been made to the low side limit fine adjustment position, no further process can be performed and the routine moves to step P10. When adjustment has not yet reached the limit fine adjustment position, the routine moves to step P9, the rear derailleur 97f is moved to a fine adjustment position one level to the low side, and the transmission positions are changed to the fine adjustment positions one level to the low side in the respective ten transmission positions signals RPOS of the rear derailleur 97r. Thus, all transmission positions are adjusted in a batch to fine adjustment positions one level to the low side. Then, the routine moves to step P10. That is, even during the adjustment mode, normal transmission operations are performed when the shift-up switch 131r and shift-down switch 133r turned ON without being pressed and held.

When it is determined that the adjustment mode is not set (i.e., MI=0), the routine jumps from step P3 to step P10. In step P10, a determination is made as to whether or not the shift-up switch 131r has been turned ON. In step P11, a determination is made as to whether or not the shift-down switch 133r has been turned ON.

When it is determined that the shift-up switch 133r is turned ON, the routine moves from step P10 to step P12. In step P12, a determination is made as to whether or not the transmission position signal RPOS has a value of 10. The rear transmission position signal RPOS changes, for example, from 1 to 10. The number 1 indicates the transmission position on the lowest side (sprocket on the largest diameter side) of the sprocket group 99f, while number 10 indicates the transmission position on the lowest side (sprocket on the smallest diameter side). The relationship between the transmission position signal RPOS and the output of the position sensor 128r is stored in the memory of the rear control section 127r.

When the transmission signal RPOS has the value 10, there is no further processing since the shift-up is not possible, and the routine moves to step P11. When the transmission position signal RPOS is not 10, the routine moves to step P13, the transmission position signal RPOS is incremented 1, and the routine moves to step P11. Thus, the motor 125r is rotated, and the rear derailleur 97r is moves in the shift-up direction.

When it is determined that the shift-down switch 133r is turned ON, the routine jumps from step P11 to step P14. In step P14, a determination is made as to whether or not the transmission position signal RPOS is 1. When the transmission signal RPOS has the value 1, there is no further processing since the shift-down is not possible, and the routine returns to step P2. When the transmission position signal RPOS is not 1, the routine moves to step P15, the transmission position signal RPOS is decremented 1, and the routine returns to step P2. Thus, the motor 125r is rotated, and the rear derailleur 97r is moves in the shift-down direction.

When the power supply is turned ON, the display controller 118 is initialized in step Q1. In step Q2, the mode information MI generated by the front control section 127f, the transmission position signal FPOS, the voltage information VD and the transmission position signal RPOS changed by the rear control section 127r are acquired.

In step Q3, a determination is made as to whether or not the adjustment mode is set based on the mode information MI. When the adjustment mode is set, the routine moves to step Q4, and the fine adjustment display screen is switched to the display screen of the display element 32r shown in FIG. 9. In the fine adjustment display screen, as previously mentioned, the fine adjustment position, which is the adjustment amount, is a numeric value from 1 to 10 displayed in the numeric display region 34r of the display element 32r, and a plus or minus symbol is displayed in the direction display region 36r in accordance with the adjustment direction. For example, the plus symbol indicates an adjustment direction on the low side (the side of the large diameter sprocket of the sprocket group 99r), and the minus symbol indicates an adjustment direction on the top side (the side of the small diameter sprocket side in the sprocket group 99r). The display of the adjustment amount and adjustment direction changes in accordance with the adjustment amount and the adjustment direction each time the transmission operating device 121r is pressed and held.

When the adjustment mode is not set, the routine moves from step Q3 to step Q5, and the display screen is switched to the transmission position display screen of FIG. 8. As previously described, in the transmission position display screen, one of, for example, ten transmission positions of the rear derailleur 97r is displayed as a numeric value from 1 to 10, and remaining power supply is displayed in three levels in the remaining power supply display region 38f based on the voltage information VD. When this process ends, the routine returns to step Q2.

In this case, since the amount of adjustment during the fine adjustment operation is displayed on the fine adjustment display screen displayed on the display element 32r, the amount of adjustment can be accurately ascertained by viewing the fine adjustment display screen while making the fine adjustment of the transmission position. Therefore, the fine adjustment operation can be readily performed while viewing the adjustment amount while riding, and similar fine adjustment operations can be repeated while confirming the amount of adjustment.

Although a mode switch is provided on the front derailleur in the above embodiment, the mounting position of the mode switch is not limited to the front derailleur. For example, a mode switch 229 can also be mounted on, for example, the electrically driven drive part 18r of the rear derailleur 97r. Furthermore, the mode switch can also be provided on the transmission operation part and at a position allowing easy manual operation.

Although the amount of adjustment is changed by pressing and holding a shift-up switch and shift-down switch of the transmission operation part in the above embodiment, the present invention is not limited to this method. For example, the position of the rear derailleur may also be finely adjusted by operating a special switch, or double-clicking the shift-up switch and shift-down switch. Furthermore, the amount of adjustment may also be changed in accordance with the press-and-hold time.

Although all transmission positions are shifted when an adjustment amount is set in the adjustment mode (fine adjustment process) in the above embodiment, adjustment may also be performed to completely change each transmission position, and adjust only specific transmission positions (for example, transmission positions excluding the outermost on the low side and outermost on the top side).

Figure 10:
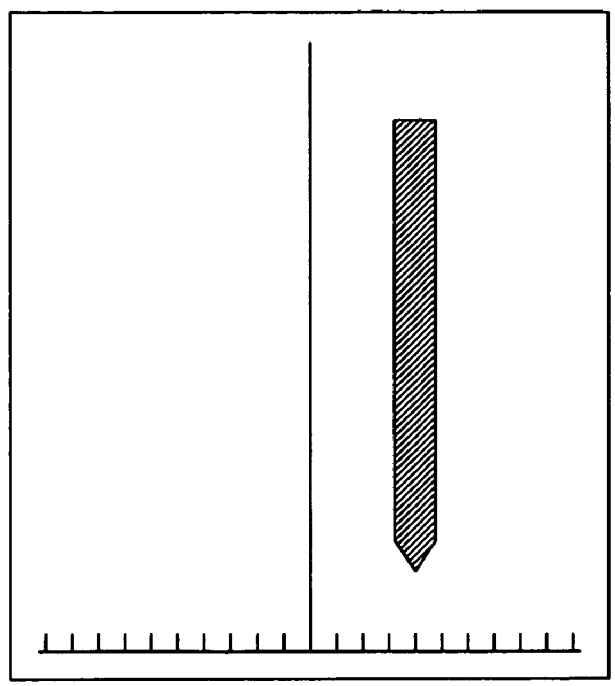
FIG. 10 is an enlarged top plan view, similar to FIG. 9, of the fine adjustment display screen in accordance with another embodiment of the present invention.

Although a segment-type liquid crystal display device is used as the display element in the above embodiment, the display device used in the display element is not limited to a segment-type liquid crystal display device. For example, a dot matrix type liquid crystal display device, display devices using light-emitting diodes, and other types of display devices can be used. In the case of a display device such as a dot matrix type or the like capable of freely displaying graphics and characters, the adjustment amount and adjustment direction can be graphically display simultaneously, as shown in FIG. 10. Furthermore, when the display device is capable of displaying colors, the adjustment direction may be displayed by a color, and the adjustment amount may be displayed numerically and graphically. In this case the graphic may change in stages.

Although a transmission operating device 121r and the transmission display device 119r for the rear derailleur 97r is provided on the brake bracket 117f of the front brake lever 113f in the above embodiment, the transmission operating device 121r and transmission display device 119r for the rear derailleur 97r can also be provided on the brake bracket 117r of the rear brake lever 113r.

Figure 13:
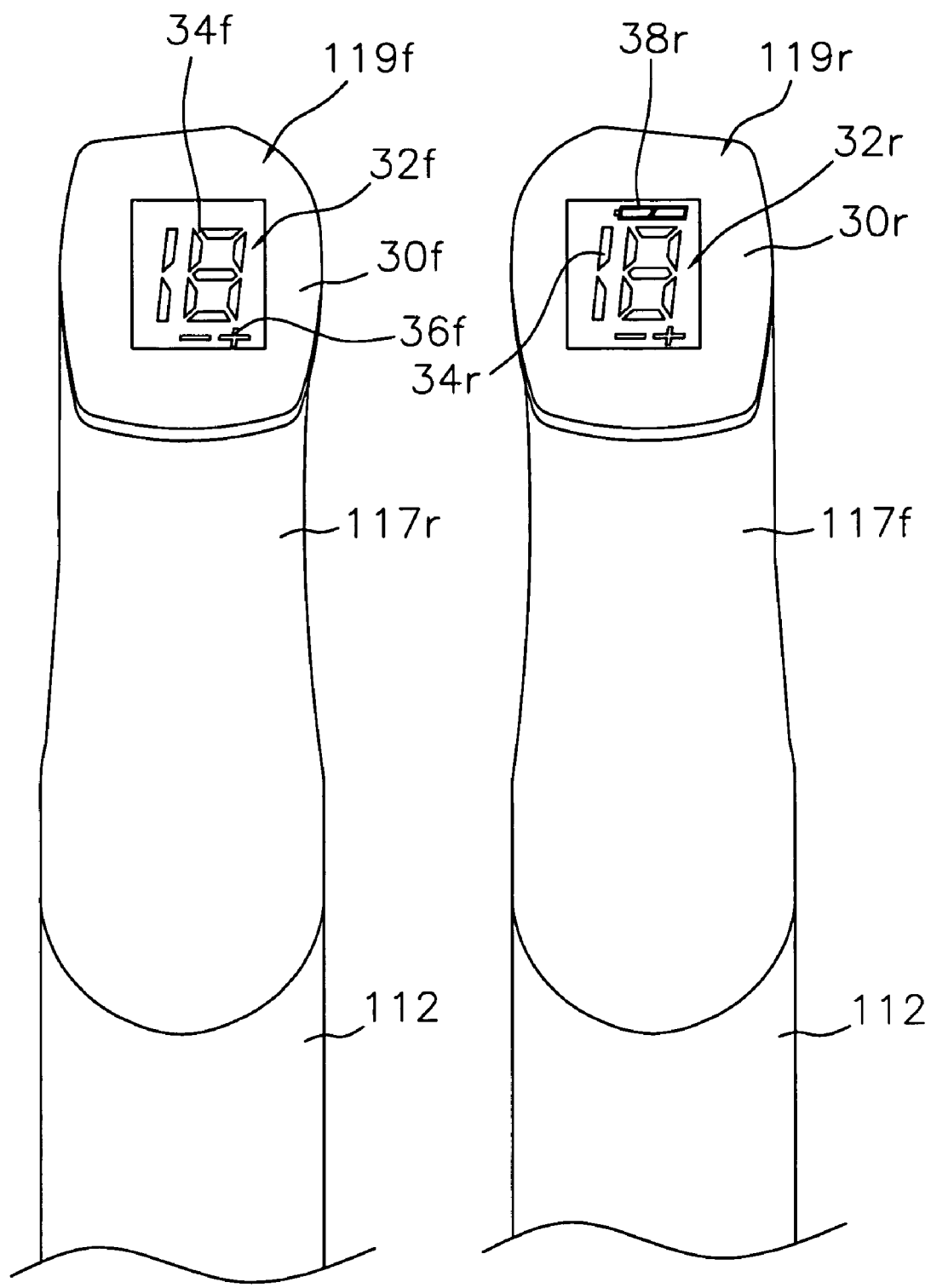
FIG. 13 is an enlarged, partial top plan of view, similar to FIG. 3, the left and right bicycle control devices in accordance with another embodiment of the present invention.

Although the fine adjustability of the front derailleur 97f has not been described in the above embodiment, the front derailleur 97f can also be finely adjustable. In this case, the transmission display device 119f can be configured similar to the transmission display device 119r, as shown in FIG. 13. Specifically, the transmission display device 119f is also configured to switch between displaying the transmission position display screen during the normal operating mode and the fine adjustment display screen during the adjustment mode. The display element 32f preferably has two display regions, including a numeric display region 34f capable of displaying numbers up to the number 10 in two segments and seven segments, and a direction display region 36f that displays direction as plus and minus symbols. Normally, a transmission position, for example position 2, of the front derailleur 97f is displayed numerically in the numeric display region 34f. In the adjustment mode, the amount of adjustment performed in the adjustment operation is preferably displayed numerically in 10 levels, and the adjustment direction is displayed as a plus or minus symbol in the numeric display region 34f. In this case, the minus symbol, for example, indicates an adjustment direction on the low side (the side of the small diameter sprocket side in the sprocket group 99f), and the plus symbol, for example, indicates an adjustment direction on the top side (the side of the large diameter sprocket of the sprocket group 99f).

Furthermore, the mode switch for setting the adjustment mode of the front derailleur 97f can be such as the mode switch 129 attached to the front derailleur 97f as a special switch of the front derailleur 97f, and the mode switch 129 provided on the rear derailleur 97r as a special switch of the rear derailleur 97r as disclosed in the other embodiment.

Furthermore, the operation of setting the adjustment mode can also be allocated to the rear derailleur 97r and the front derailleur 97f by short multiple operations (for example, double click) and the operation time (press and hold) of the mode switch 119 provided on the front derailleur 97f. An example of an allocated operation for setting the adjustment mode by the operation time of the mode switch 119 is described based on FIG. 14.

Figure 14:
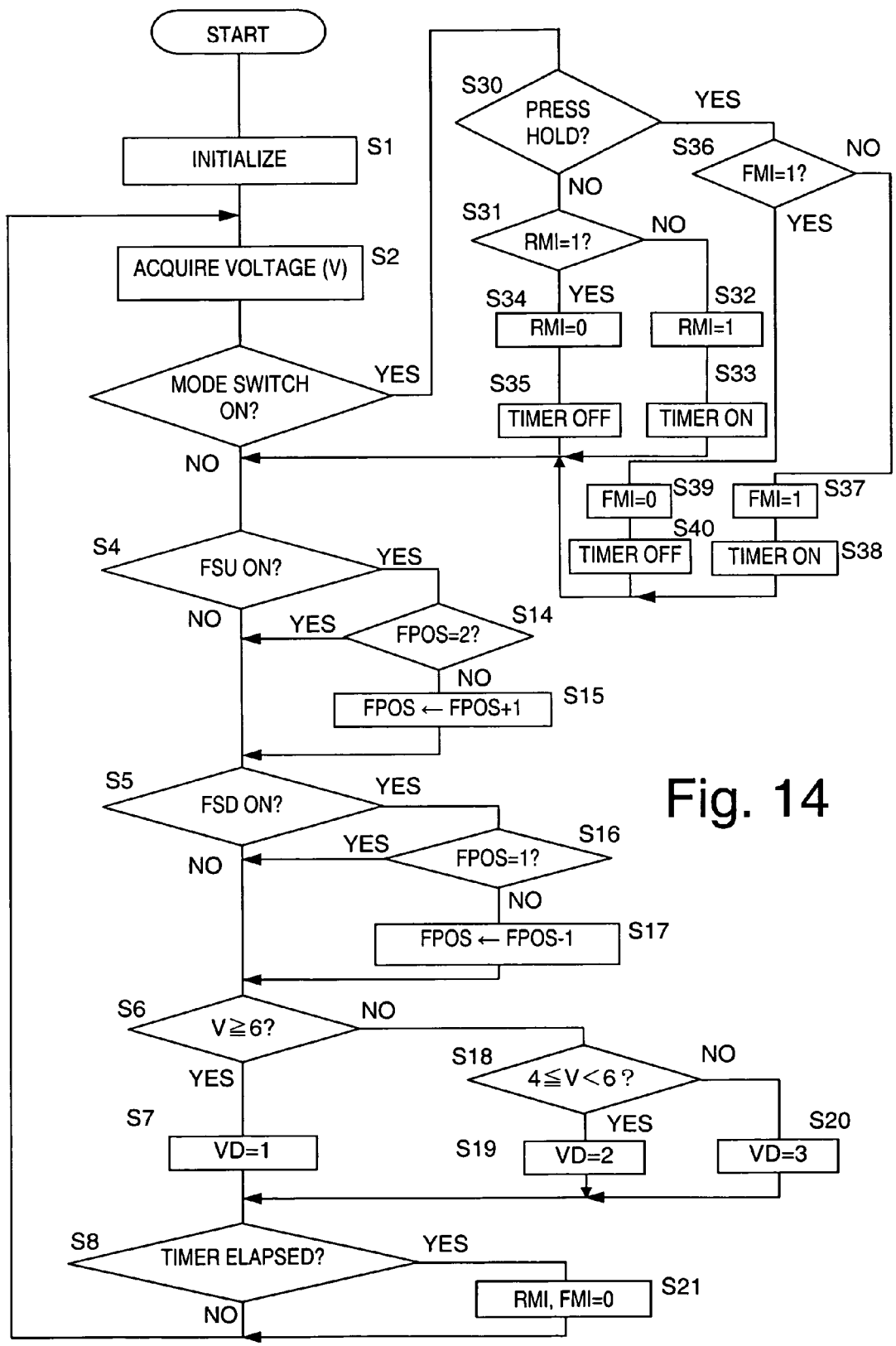
FIG. 14 is a flow chart, similar to FIG. 5, showing the processing of the control executed by the front control section in accordance with another embodiment of the present invention.

In FIG. 14, the description of the operations of steps S1 through S8 and steps S14 through S21 is abbreviated with the exceptions of resetting the rear mode information RMI (information indicating whether or not the adjustment mode is set for the rear derailleur) and the front mode information FMI (information indicating whether or not the adjustment mode is set for the front derailleur) in step S21, since it is similar to FIG. 5.

In FIG. 14, when mode switch 129 has been turned ON, the routine jumps from step S3 to step S30. In step S30, a determination is made as to whether or not the mode switch 129 has been pressed and held for, example, for one second or more. In this case, when the mode switch 129 has been pressed and held, the adjustment mode is set for the front derailleur and not for the rear derailleur.

When it is determined that the switch has not been pressed and held for a prescribed period of time, the routine moves from step S30 to step S31. In step S31, a determination is made as to whether or not the rear mode information RMI that indicates whether the rear derailleur 97r is in the adjustment mode has already been set to 1, that is, whether or not the adjustment mode is already set for the rear derailleur 97r. When the adjustment mode is not set (RMI=0), the routine moves to step S32, and the rear mode information RMI is set to 1. Thus, the rear derailleur 97r is set to the adjustment mode. In step S33, the timer T is turned ON and started. The timer T resets the adjustment mode. When the rear adjustment mode has been set (RMI=1), the routine moves from step S31 to step S34, and the rear mode information RMI is reset to 0. In step S35, the timer T is turned OFF and stopped. When this process ends, the routine moves to step S4.

When it is determined that the switch has been pressed and held for a prescribed period of time, the routine jumps from step S30 to step S36. In step S36, a determination is made as to whether or not the front mode information FMI that indicates whether or not the front derailleur is in the adjustment mode has already been set to 1, that is, whether or not the adjustment mode is already set for the front derailleur. When the adjustment mode is not set (FMI=0), the routine moves to step S37, and the front mode information FMI is set to 1. Thus, the front derailleur 97f is set to the adjustment mode. In step S38, the timer T is turned ON and started. When the front adjustment mode has been set (FMI=1), the routine jumps from step S36 to step S39, and the front mode information FMI is reset to 0. In step S40, the timer T is turned OFF and stopped. When this process ends, the routine moves to step S4.

Thus, the operation to set the adjustment mode is easy since the front or rear adjustment mode is set by the operation time of the mode setting switch 129. Furthermore, the operation of the setting the adjustment mode for the rear derailleur is improved since the operations of settings the rear and front derailleurs are simple and do not require a press-and-hold operation to set the rear derailleur.

The control of the rear control section 127r and the display controller 118 for this embodiment uses the processing of FIGS. 6 and 7. Thus, the rear mode information (RMI) can be acquired in step S2 of FIG. 6 in the case of the rear control section 127r. Moreover, the display controller 118 can control the display of the transmission display devices 119f and 119r in accordance with the acquired mode information in step Q3 of FIG. 7.

In regard to the operation when the fine adjustment mode is set for the front derailleur, processes similar to those of steps P3 through P9 of FIG. 6 are performed to determine whether or not the front adjustment mode is set.

Furthermore, the adjustment mode can be set for the front and rear derailleurs by repeated operation rather than operation time. In this case, the determination of step S30 can be made by, for example, double clicking or single clicking operations.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle display comprising:
a mounting part configured and arranged to be attached to a bicycle; and
a display element supported on the mounting part, the display element being configured and arranged to display a fine adjustment display screen that indicates an adjustment amount occurring during fine adjustment of a transmission position of a bicycle transmission device.

2. A bicycle display comprising:
a mounting part configured and arranged to be attached to a bicycle; and
a display element supported on the mounting part, the display element being configured and arranged to display a fine adjustment display screen that indicates an adjustment amount occurring during fine adjustment of a transmission position of a bicycle transmission device,
the display element being further configured and arranged to display a transmission position display screen that indicates a current transmission position of the bicycle transmission device.

3. The bicycle display device as set forth in claim 2, further comprising
a display controller configured and arranged to control the display element, and to switch the display screen of the display element between the fine adjustment display screen and the transmission position display screen in accordance with a switching operation.

4. A bicycle display comprising:
a mounting part configured and arranged to be attached to a bicycle; and
a display element supported on the mounting part, the display element being configured and arranged to display a fine adjustment display screen that indicates an adjustment amount occurring during fine adjustment of a transmission position of a bicycle transmission device,
the mounting part including a brake lever bracket that is configured and arranged to be detachably and reattachably installed on a handlebar of the bicycle.

5. The bicycle display device as set forth in claim 4, wherein
the brake lever bracket is a drop handlebar mounting bracket; and
the display element is attached to a top surface of the drop handlebar mounting bracket.

6. A bicycle display comprising:
a mounting part configured and arranged to be attached to a bicycle; and
a display element supported on the mounting part, the display element being configured and arranged to display a fine adjustment display screen that indicates an adjustment amount occurring during fine adjustment of a transmission position of a bicycle transmission device; and
a display controller being configured and arranged to control the display element between the fine adjustment display screen and the transmission position display screen in accordance with a switching operation and to display an adjustment direction in addition to the adjustment amount when the fine adjustment display screen is displayed.

7. The bicycle display device as set forth in claim 6, wherein
the display element includes a numeric display region and a direction display region; and
the display controller is configured and arranged to display the adjustment amount in the numeric display region, and display the adjustment direction in the direction display region when the fine adjustment display screen is displayed.

8. The bicycle display device as set forth in claim 6, wherein
the display element includes a dot matrix type display; and
the display controller is configured and arranged to display a diagram of the adjustment amount and adjustment direction of the transmission position on the dot matrix type display when the fine adjustment display screen is displayed.

9. The bicycle display device as set forth in claim 3, further comprising
a screen switching operation part remotely connected to the display controller so that the screen switching operation part is provided near the bicycle transmission device.

10. The bicycle display device as set forth in claim 3, wherein
the display controller is configured and arranged to switch the fine adjustment display screen between displaying a rear derailleur adjustment and displaying a front derailleur adjustment depending on an amount of time that the screen switching operation part is operated.

11. A bicycle control device comprising:
a mode operation part configured and arranged to set a fine adjustment mode to adjust a transmission position of at least one of a front derailleur and a rear derailleur;

a fine adjustment operation part configured and arranged to perform fine adjustment of the transmission position of the transmission device when in the fine adjustment mode; and a controller configured and arranged to control the fine adjustment of the transmission position of the transmission device when in the fine adjustment mode in accordance with operation of the fine adjustment operation part, the mode operation part being part of one of the front derailleur and the rear derailleur.

12. The bicycle control device as set forth in claim 11, wherein the mode operation part is part of the front derailleur.

13. The bicycle control device as set forth in claim 12, wherein the mode operation part is configured and arranged to perform fine adjustment of the transmission position of the rear derailleur in accordance with the operation of the fine adjustment operation part in the fine adjustment mode.

14. The bicycle control device as set forth in claim 13, wherein the controller includes a front control section configured to control the front derailleur, and a rear control section configured to control the rear derailleur, the front control section is further configured to output fine adjustment mode information to the rear control section when the fine adjustment mode is set by operation of the mode operation part and the rear control section is further configured to control fine adjustment of the rear derailleur in accordance with the operation of the fine adjustment operation part when the fine adjustment mode information is received.

15. The bicycle control device as set forth in claim 14, wherein the mode operation part includes an ON/OFF switch that is configured to operate the front control section to output fine adjustment mode information to the rear control section when the ON/OFF switch is turned ON less than a prescribed period of time, and that is configured to control fine adjustment of the front derailleur in accordance with the operation of the fine adjustment operation part when the ON/OFF switch is turned on longer than a predetermined time.

16. The bicycle control device as set forth in claim 11, further comprising a bicycle display device including a mounting part configured and arranged to be attached to a bicycle, a display element supported on the mounting part and controlled by the controller, the display element being configured and arranged to display a fine adjustment display screen that indicates an adjustment amount occurring during fine adjustment of a transmission position of a bicycle transmission device, the controller being configured to switch the display screen of the display element between the fine adjustment display screen and a transmission position display screen in accordance with operation of the mode operation part.

17. The bicycle control device as set forth in claim 11, wherein the controller is configured to cancel the fine adjustment mode when a predetermined time has elapsed after the fine adjustment mode has been set by an operation of the mode operation part.

18. The bicycle control device as set forth in claim 1, further comprising a display controller configured and arranged to control the display element to selectively display different fine adjustment amounts for adjusting a single transmission gear position in response to fine adjustment of the current transmission position of the bicycle transmission device.

* * * * *